(12) United States Patent
Fish et al.

(10) Patent No.: US 8,384,266 B2
(45) Date of Patent: Feb. 26, 2013

(54) BRUSH WEAR DETECTOR SYSTEM WITH WIRELESS SENSOR

(75) Inventors: William Earl Fish, Amsterdam, NY (US); Jorge Cano Casas, Queretaro (MX); Frank Austin Scalzo, III, Rotterdam Junction, NY (US); Luis Alejandro De Leon Teran, Queretaro (MX); Albert Eugene Steinbach, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 231 days.

(21) Appl. No.: 13/074,370

(22) Filed: Mar. 29, 2011

(65) Prior Publication Data
US 2012/0248929 A1    Oct. 4, 2012

(51) Int. Cl.
*H02K 13/00* (2006.01)
(52) U.S. Cl. .................................. 310/248; 310/239
(58) Field of Classification Search .......... 310/238–249
See application file for complete search history.

(56) References Cited

U.S. PATENT DOCUMENTS

| | | | |
|---|---|---|---|
| 3,654,504 A | 4/1972 | Susdorf et al. | |
| 4,316,186 A * | 2/1982 | Purdy et al. | 340/648 |
| 4,528,557 A | 7/1985 | Braun | |
| 4,536,670 A * | 8/1985 | Mayer | 310/249 |
| 4,636,778 A * | 1/1987 | Corkran et al. | 340/648 |
| 4,652,783 A * | 3/1987 | Cheesmore et al. | 310/249 |
| 4,723,084 A | 2/1988 | Reynolds | |
| 4,739,208 A * | 4/1988 | Kimberlin | 310/242 |
| 4,743,787 A | 5/1988 | Bunner et al. | |
| 5,509,625 A * | 4/1996 | Oullette et al. | 244/134 D |
| 5,870,026 A * | 2/1999 | Challenger | 340/648 |
| 2003/0011388 A1 | 1/2003 | Klaar | |
| 2004/0155553 A1* | 8/2004 | Wang | 310/248 |
| 2009/0153089 A1 | 6/2009 | Hobelsberger | |
| 2009/0267782 A1 | 10/2009 | Mark et al. | |

FOREIGN PATENT DOCUMENTS

| | | |
|---|---|---|
| EP | 0 232 209 A1 | 8/1987 |
| EP | 2 112 518 A1 | 10/2009 |
| GB | 2 172 445 A | 9/1986 |
| WO | 2008/102003 A3 | 10/2003 |

OTHER PUBLICATIONS

Search Report issued in connection with GB Application No. 1205148.8, Jul. 6, 2012.

* cited by examiner

*Primary Examiner* — Thanh Lam
(74) *Attorney, Agent, or Firm* — James W. Pemrick; Ernest G. Cusick; Frank A. Landgraff

(57) ABSTRACT

A brush wear detector system for a dynamoelectric machine is provided. The brush wear detector system includes a brush holder, and at least one brush located within the brush holder. At least one spring is in contact with the brush and the spring operates to force the brush against an electrically conductive member of the dynamoelectric machine. A wireless sensor is configured to detect when a predetermined amount of wear has occurred to the at least one brush, and is also configured to identify the brush having the predetermined amount of wear. The wireless sensor is attached to the at least one brush.

20 Claims, 5 Drawing Sheets

BRUSH WEAR DETECTOR SYSTEM WITH WIRELESS SENSOR

BACKGROUND OF THE INVENTION

The subject matter disclosed herein relates to the art of brush wear detection and, more particularly, to a brush wear detector having a wireless sensor.

Dynamoelectric machines such as generators or direct current motors use carbon brushes to transfer power between an external source of electric power and a rotating commutator associated with the rotor. Since the brushes are in contact with the commutator, they must be periodically replaced after a predetermined amount of wear to assure adequate current conduction and to prevent damage to the commutator. Alternating current machines similarly often employ brushes and slip rings for the transfer of electric power with similar wear problems.

BRIEF DESCRIPTION OF THE INVENTION

According to one aspect of the invention, a brush wear detector system for a dynamoelectric machine is provided. The brush wear detector system includes a brush holder, and at least one brush located within the brush holder. At least one spring is in contact with the brush and the spring operates to force the brush against an electrically conductive member of the dynamoelectric machine. A wireless sensor is configured to detect when a predetermined amount of wear has occurred to the at least one brush, and is also configured to identify the brush having the predetermined amount of wear. The wireless sensor is attached to the at least one brush.

According to another aspect of the invention, a brush wear detector system for a dynamoelectric machine is provided. The brush wear detector system includes a brush holder and at least one brush located within the brush holder. At least one spring is in contact with the at least one brush and operates to force the brush against an electrically conductive member of the dynamoelectric machine. A wireless sensor is configured to detect when a predetermined amount of wear has occurred to the at least one brush. The wireless sensor is configured to identify the at least one brush having the predetermined amount of wear. A temperature sensor is attached to the wireless sensor, and the temperature sensor is used for detecting a temperature either in or near the at least one brush. The wireless sensor is attached to the at least one brush.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings.

Figure 1:
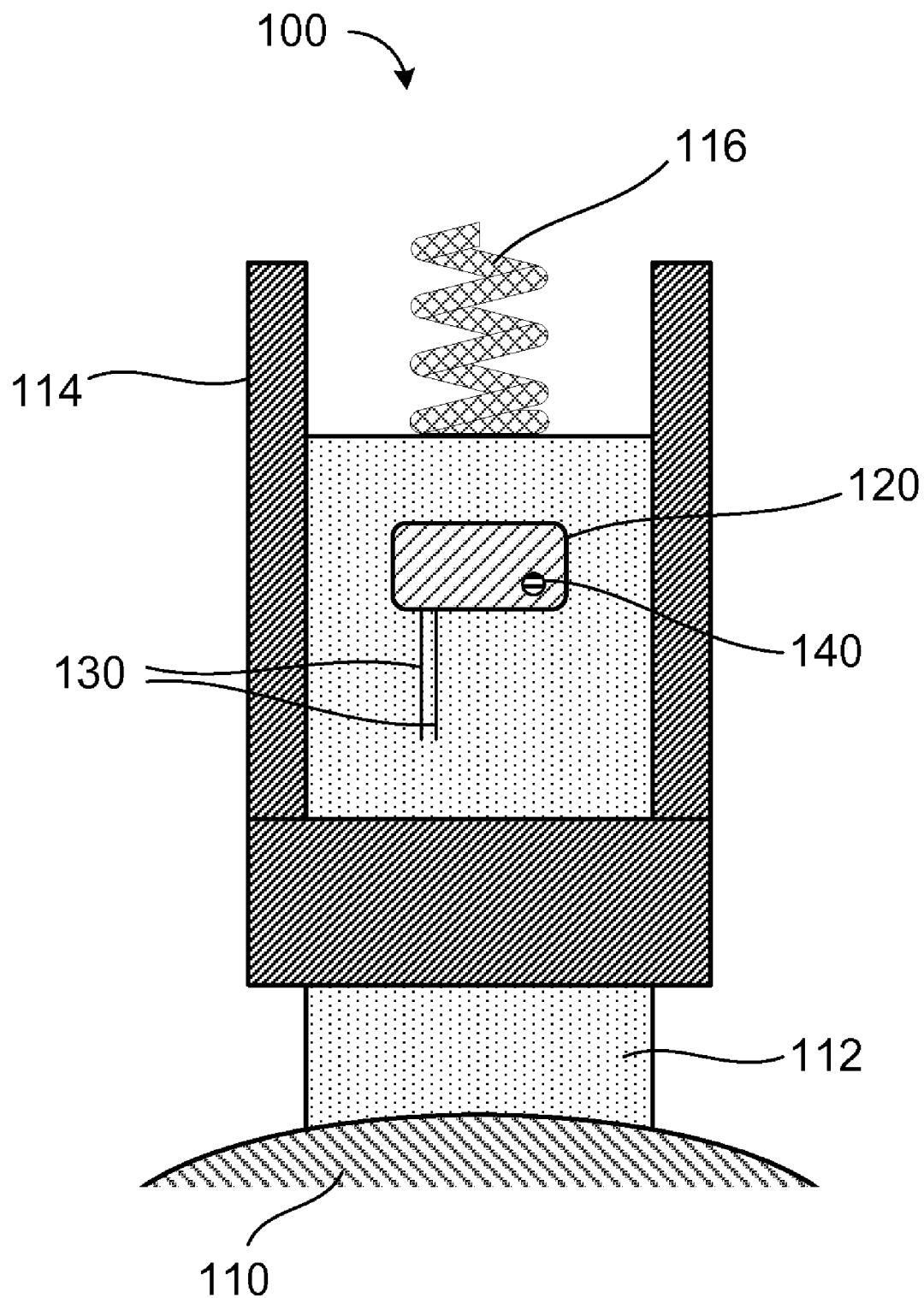
FIG. 1 illustrates a simplified, elevational view of a brush assembly incorporating a wireless brush wear detector system, according to an aspect of the present invention.

The detailed description explains embodiments of the invention, together with advantages and features, by way of example with reference to the drawings.

DETAILED DESCRIPTION OF THE INVENTION

A variety of brush wear indicators are known for signaling the need for brush replacement. Typically, such apparatus includes electrical circuitry whose operation is dependent upon the condition of wear as sensed by movement of a self-winding brush follower spring which applies a biasing force against the rear end of the brush the other end of which is in contact with the commutator or slip ring of a dynamoelectric machine. When the brush is in a new or usable condition, the coil of the spring is in a first position away from the commutator. As the brush wears, the coil eventually reaches a second position near the commutator. This movement is utilized to open or close a set of electrical contacts, which thereby energizes or deenergizes a wired electrical circuit for signaling (via wires or cable) the need for brush replacement.

A second well known type of detector system employs a hard electrical conductor embedded within the brush. When the brush wears by a predetermined amount, the hard conductor contacts the commutator (or slip ring) which may serve to complete an electric circuit or, as by wearing through a loop at the end of the conductor, break an existing circuit. In either case, a worn brush condition is indicated. These embedded conductor systems suffer from the two primary deficiencies of having a hard electrical current carrying member in the current carrying brush and, since the conductor is usually metallic, of a metal to metal contact with the commutator or slip ring.

Previous methods or attempts have resulted in undesirable material being spread throughout portions of the dynamoelectric machine. For example, as the hard electrical conductor wears away against the rotor it creates undesirable particulate matter. This particulate matter can build up and have negative effects on various components in the dynamoelectric machine. In addition, the prior attempts required each brush to have a sensor and each sensor was individually wired back to a central location. This multitude of wires creates congestion and provides many areas for wear and faults to develop, further complicating the system. The multitude of wires connected between the stationary supports and replaceable brushes also significantly complicates and prolongs the brush changing operation for the equipment operator.

Radio frequency identification ("RFID") tagging is a known method of identification in certain arts. In particular, a reader of a conventional RFID system produces and emits an electromagnetic interrogation field at a specific frequency when excited by connected electronic drive circuitry. The RFID tag or device typically includes a semiconductor chip having RF circuits, logic, and memory, as well as an antenna. The device functions in response to the coded radio frequency (RF) signal. If the device is positioned within the interrogation field for a sufficient time, the RFID tag will become stimulated and transmit a uniquely coded signal that is received by the reader or a separate receiving antenna. The RF carrier signal is demodulated to recover information stored in the RFID device. Various RFID structures, circuits, and programming protocols are known in the art.

Although RFID devices or tags are not yet as prevalent as other identification means, RFID devices are gaining in popularity in various applications. These include railway boxcar and tractor-trailer identification schemes, fare cards for buses and subways, animal identification, employee and security badges, and in automatic highway toll systems. In an automatic highway toll system, drivers mount an RFID device on the front vehicle windshield. The RFID device is preprogrammed with driver information, such as account status, vehicle information, etc. As the vehicle passes through a toll, a base transmitter at the tollbooth emits a signal which is reflected by the RFID device. If the driver's account is satisfactory, a green light activates; indicating the driver is free to pass through the toll.

Electronic RFID devices are commercially available and do not per se embody the invention. Early RFID systems were developed utilizing relatively large packages, which limited the products on which they could be used. More recently, RFID devices have been made smaller so that they may be readily incorporated in tags or labels and their use can be more widespread. Such electronic devices are characterized in that they are thin, flat and generally flexible devices.

As one of ordinary skill in the art will appreciate, RFID tags may be characterized as "active" or "passive". Active RFID tags use internal batteries to power their circuits. An active tag also uses its battery to broadcast radio waves to a reader. Active tags generally broadcast high frequencies from 850 to 950 MHz that can be read 100 feet or more away. Passive RFID tags rely entirely on the reader as their power source. These tags may be read up to 20 feet away, and they have lower production costs. In general, either tag works in the same way: 1) data stored within an RFID tag's microchip waits to be read; 2) the tag's antenna receives electromagnetic energy from a RFID reader's antenna; 3) using power from its internal battery—in the case of active tags—or power harvested from the reader's electromagnetic field (in the case of passive tags), the tag sends radio waves back to the reader; and 4) the reader picks up the tag's radio waves and interprets the signals over carrier frequencies as meaningful data.

The invention of the present application proposes to integrate RFID transponder technology into the brushes of a dynamoelectric machine, such as a generator or motor, to make it possible to transfer data wirelessly from the brushes to a position near the brushes, such as a location on the surrounding generator/motor casing without any requirement for power input to the transponder disposed on the brush.

Referring now to the drawings and more particularly to FIG. 1, reference numeral 110 denotes the fragmentary portion of a commutator or slip ring of a dynamoelectric machine. As is well known, such a machine is comprised of two main parts, a stator assembly and a rotor assembly. The element 110 forms a part of the rotor assembly. Power transferred to or from the rotor is accomplished by means of a brush assembly 100 including one or more brushes 112 which are in slidable contact with the commutator 110. The commutator 110 may also be any suitable electrically conductive member of the dynamoelectric machine. The brush assembly 100, moreover, may be contained within a brush holder or box 114 which is secured to the stator assembly of the motor or generator. Alternatively, the brush may be supported by a brush holder with internal, radially-aligned rods rather than an external box. One or more electrical leads, not shown, are normally embedded into or attached to the brush(es) 112 to provide connection to an external power source or electrical circuit, also not shown.

As shown in FIG. 1, the brush 112 is urged inwardly (towards commutator 110) by the force applied from a spring 116. The spring 116 helps to reduce "bouncing" of the brush 112 and applies a continual force on the brush during normal operation of the spring 116. The spring 116 can be a coil spring, leaf spring, or any suitable spring element. Accordingly, as brush 112 wears due to the frictional contact with the commutator 110, the spring 112 pushes the brush 112 towards the commutator 110.

A wireless sensor 120 is attached to the brush 112 and is used to detect when a predetermined amount of wear has occurred to the brush 112. The wireless sensor may be an active radio frequency identification device (RFID), a passive radio frequency identification device (RFID), or any other suitable type of wireless sensor as desired in the specific application. The wireless sensor 120 includes a unique identification number or code so that it can uniquely identify the brush 112 to which it is attached. The predetermined amount of brush wear may be identified by the brush 112 becoming short enough so that transmission of the signal between the stationary antenna and brush tag (or wireless sensor 120) is blocked by a portion of the brush holder 114.

One or more leads 130 may be connected to the wireless sensor, and these leads 130 are used to detect when a predetermined amount of wear has occurred. The leads 130 may be comprised of a relatively soft and innocuous material so that negative effects are reduced or eliminated when the brush wears to the ends of the leads 130. For example, the leads 130 may be formed of aluminum, copper, gold, or any other suitable metal, metal alloy or conductor as desired in the specific application.

The wireless sensor may also include a temperature sensor 140 that can be used to detect the temperature in or near the brush 112. The hottest location on the brush 112 is at the interface with the rotating commutator 110. The coolest location is at the opposite (top) end of the brush. The temperature at the top end increases as the brush becomes shorter. Therefore, the temperature of the RFID tag (or wireless sensor 120) will increase as the brush 112 wears. Therefore, this increase in temperature can be used to identify that a predetermined amount of brush wear has occurred. In addition, sensing the temperature can be very useful for detecting when a dangerous condition, such as flashover, occurs. Flashover occurs when a short circuit develops between the commutator and the brush or between adjacent commutator segments. This short circuit could be due to a break-down in the air gap between adjacent elements, brush bouncing, excessive brush wear, unwanted material build-up or any of a number of other causes. The result is an increase in temperature, and as one would expect a large increase in current flow. The increased temperatures sustained by the affected components can rapidly overstress, melt or otherwise damage these components. Unfortunately, when this occurs the generator or motor affected must be shut down as soon as possible.

The temperature sensor 140 can be used to detect the early stages of brush or system malfunction. An increase in temperature beyond the desired and expected range can indicate a potential problem. This "early warning" can be used to detect and identify problems early, so that a technician can either repair the malfunctioning or degrading component, or schedule a repair at a convenient time, and avoid catastrophic component failure.

Figure 2:
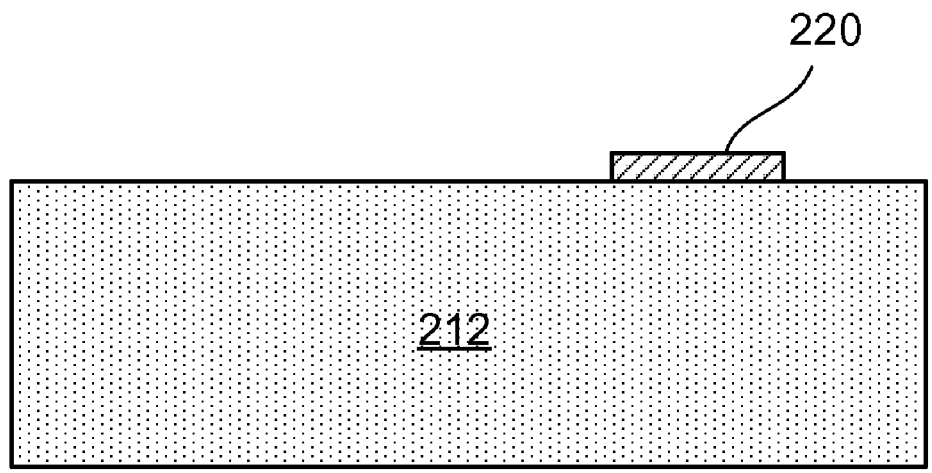
FIG. 2 illustrates a simplified, cross-sectional view of a brush incorporating a wireless sensor, according to an aspect of the present invention.
Figure 3:
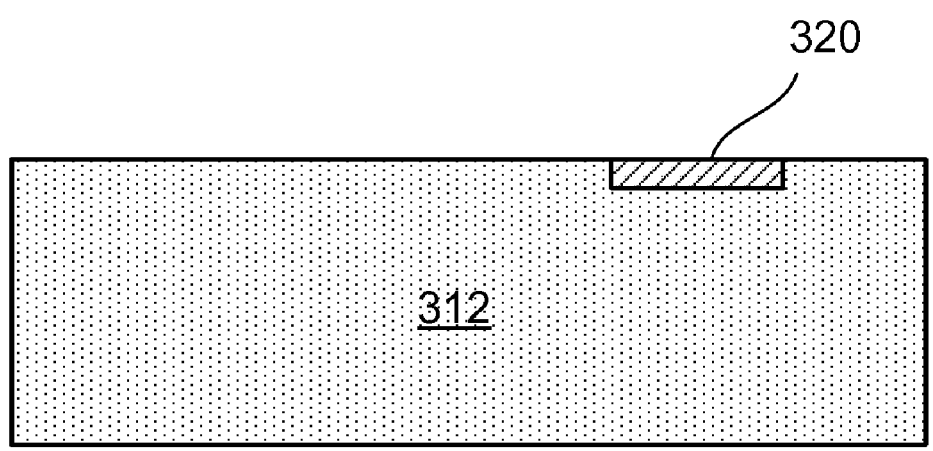
FIG. 3 illustrates a simplified, cross-sectional view of a brush incorporating a wireless sensor, according to an aspect of the present invention.

FIG. 2 illustrates a cross-sectional view of a brush 212 having a wireless sensor 220 attached to the surface of the brush. FIG. 3 illustrates a cross-sectional view of a brush 312 having a wireless sensor 320 recessed into the brush. However, it is to be understood that the wireless sensor could be completely embedded within the brush or partially recessed into the brush as well.

Figure 4:
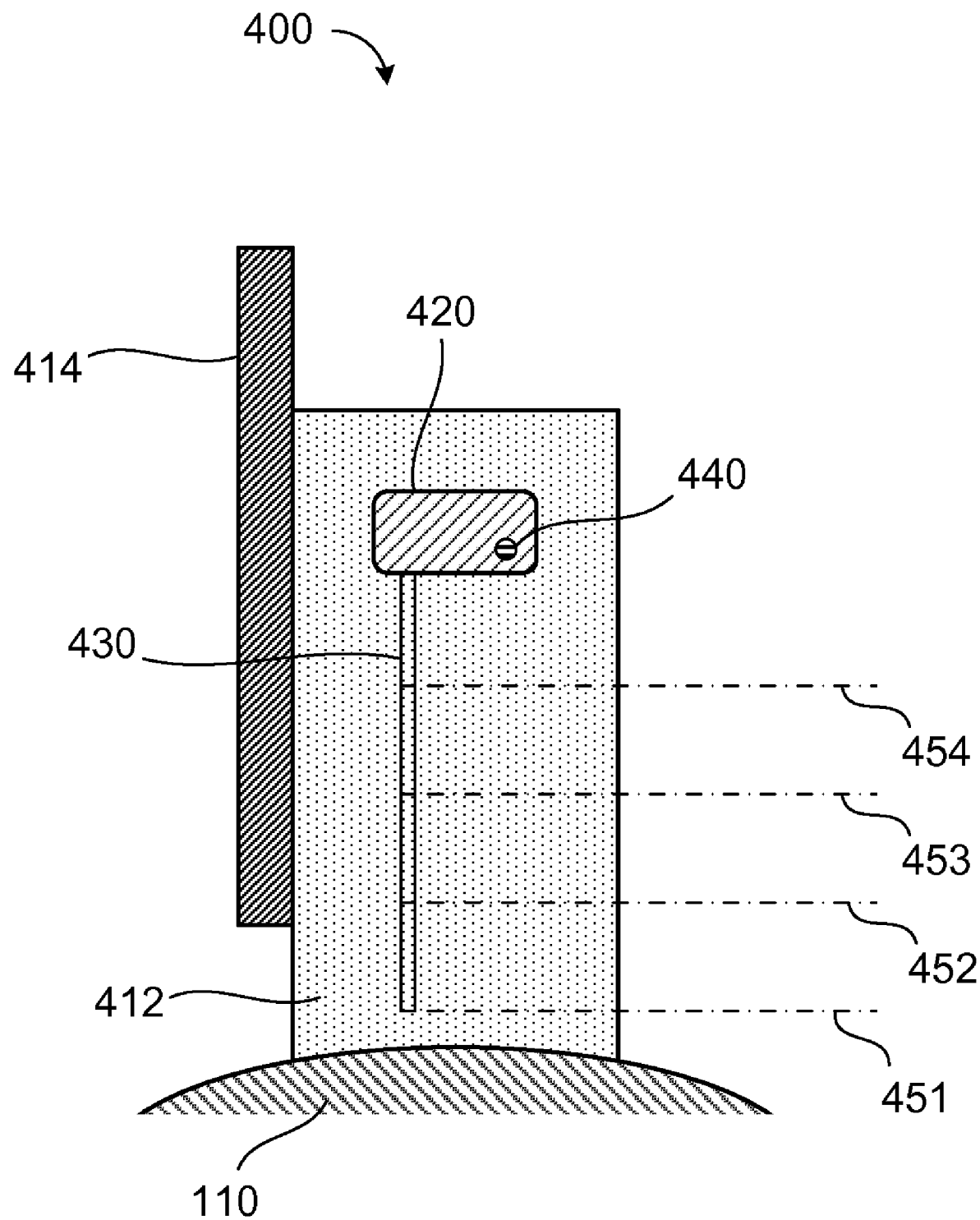
FIG. 4 illustrates a simplified, elevational view of a brush assembly incorporating a wireless brush wear detector system, according to an aspect of the present invention.

FIG. 4 illustrates a simplified, elevational view of a brush 412 having a wireless sensor 420 and lead 430, according to an aspect of the present invention. The brush 412 is held within a brush holder 414, and both comprise a brush assembly 400. The wireless sensor may also include a temperature sensor 440. The lead 430 is configured with multiple sections so that it can be used to detect when incremental amounts of predetermined wear have occurred. As one non-limiting example only, the brush 412 may include a lead 430 having four sections. Each section can represent various levels of remaining life for brush 412, e.g., level 451—100%, level 452—75%, level 453—50% and level 454—25%. Each section may be comprised of a circuit loop, so that as that circuit loop is closed or open, a respective signal can be detected by wireless sensor 420. Alternatively, the entire lead 430 may be configure with variable resistance, so that the resistance changes as wear progresses and various sections of the lead are removed.

Figure 5:
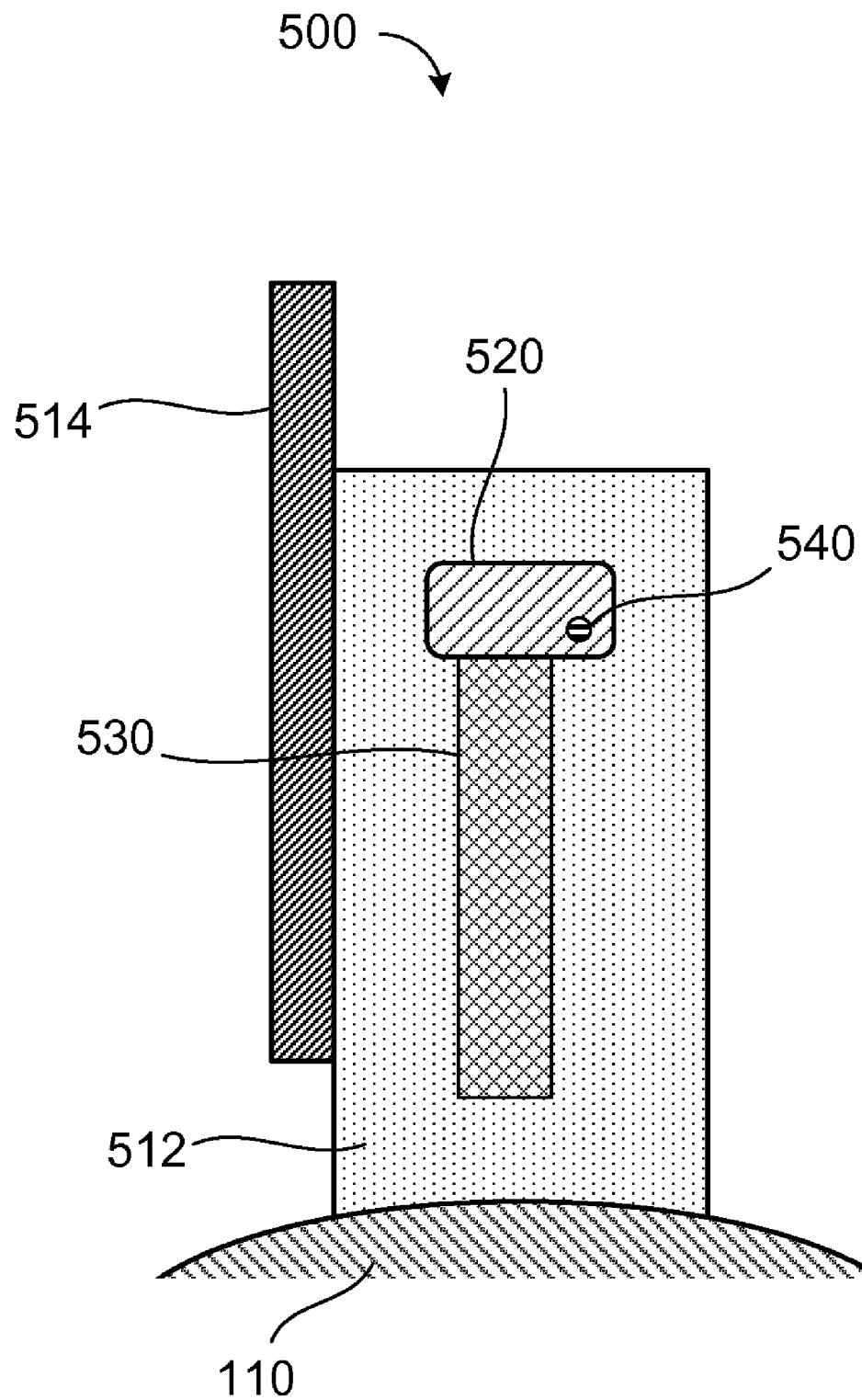
FIG. 5 illustrates a simplified, elevational view of a brush assembly incorporating a wireless brush wear detector system, according to an aspect of the present invention.

FIG. 5 illustrates a simplified, elevational view of a brush 512 having a wireless sensor 520 and detection pad 530, according to an aspect of the present invention. The brush 512 is held within a brush holder 514, and both comprise a brush assembly 500. The wireless sensor may also include a temperature sensor 540. The detection pad 530 is configured with variable resistance so that it can be used to detect when incremental amounts of predetermined wear have occurred. As one non-limiting example only, the detection pad 530 may be used to detect various levels of remaining brush life (e.g., 100%, 80%, 60%, 40%, 20%). The wireless sensor 520 is connected to the detection pad 530, and any number of predetermined wear levels can be detected as desired in the specific application.

Figure 6:
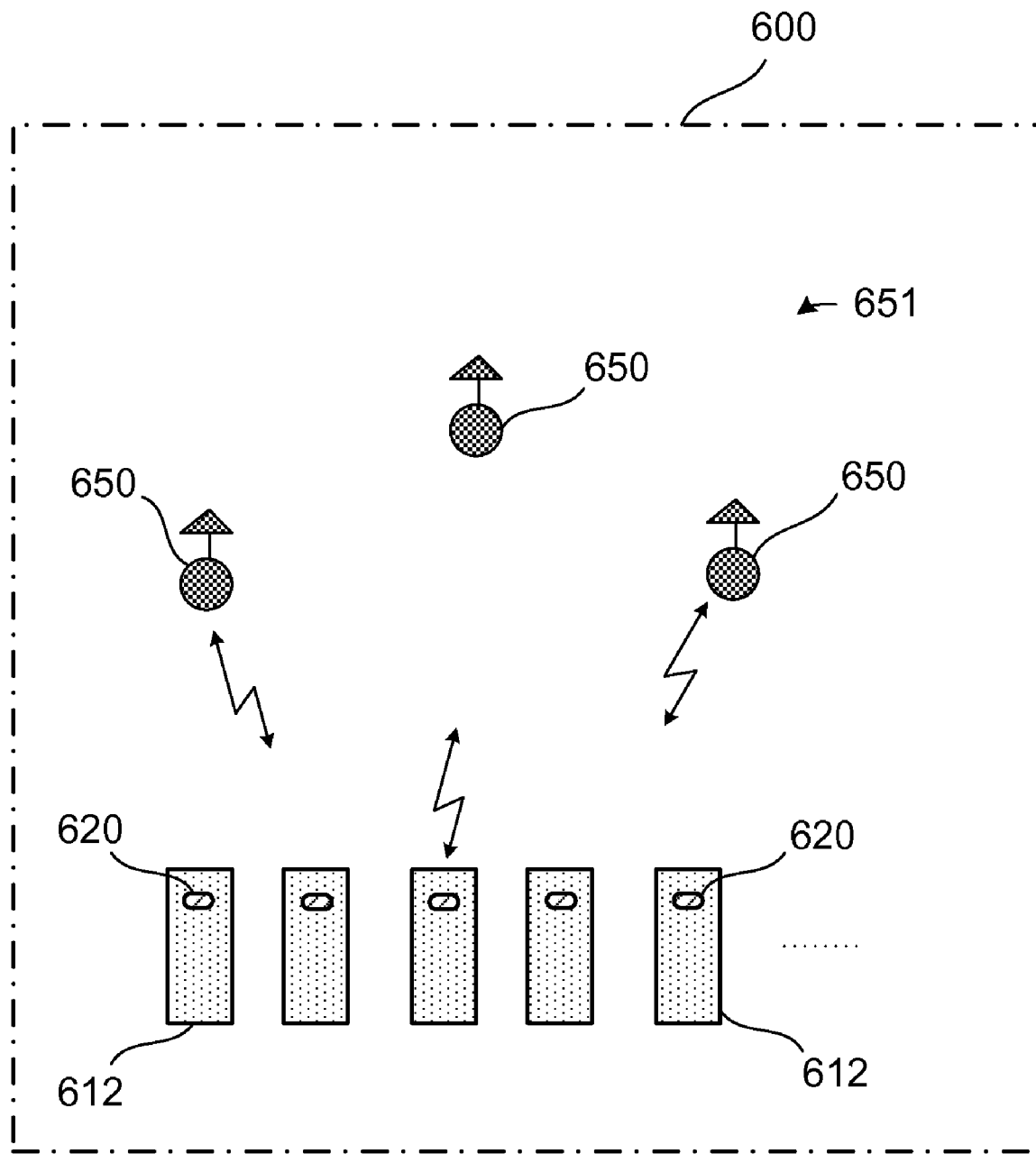
FIG. 6 illustrates a simplified schematic of a dynamoelectric machine incorporating a brush wear detector system, according to an aspect of the present invention.

FIG. 6 illustrates a simplified schematic of a dynamoelectric machine 600 incorporating the brush wear detector system, according to an aspect of the present invention. The dynamoelectric machine 600 could be a motor, generator, locomotive engine, or any other machine where brush wear detection is desired. The dynamoelectric machine 600 includes one or more brushes 612, where one or more brushes include wireless sensors 620. Any of the previously described brushes and brush assemblies, according to aspects of the present invention, could be used in dynamoelectric machine 600. One or more antennas 650 can comprise an antenna system 651, and each antenna can be located within a suitable range of the wireless sensors 620. As one non-limiting example only, the antennas 650 may be placed on the phenolic plate (not shown) between the brush sets. However, any suitable location for the antennas may be employed as desired in the specific application (e.g., internal and/or external to dynamoelectric machine 600). The antennas 650 are used to communicate with the wireless sensors 620 and may be configured for one-way and/or bi-directional communication.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A brush wear detector system for a dynamoelectric machine, the brush wear detector system comprising:
    a brush holder;
    at least one brush located within the brush holder;
    at least one spring in contact with the at least one brush and operating to force the brush against an electrically conductive member of the dynamoelectric machine;
    a wireless sensor configured to detect when a predetermined amount of wear has occurred to the at least one brush, the wireless sensor configured to identify the at least one brush having the predetermined amount of wear;
    wherein the wireless sensor is attached to the at least one brush.

2. The brush wear detector system of claim 1, wherein the wireless sensor is attached to a surface of the at least one brush.

3. The brush wear detector system of claim 1, wherein the wireless sensor is recessed into the at least one brush.

4. The brush wear detector system of claim 1, wherein the wireless sensor is at least one of, an active radio frequency identification device (RFID) and a passive radio frequency identification device (RFID).

5. The brush wear detector system of claim 1, wherein the wireless sensor further comprises:
    a temperature sensor for detecting a temperature either in or near the at least one brush.

6. The brush wear detector system of claim 5, wherein the temperature detected by the temperature sensor indicates when the predetermined amount of wear has occurred.

7. The brush wear detector system of claim 1, wherein the wireless sensor includes one or more leads, the one or more leads used to detect when the predetermined amount of wear has occurred.

8. The brush wear detector system of claim 7, wherein the one or more leads are configured to detect when incremental amounts of predetermined wear have occurred.

9. The brush wear detector system of claim 1, wherein the wireless sensor includes a detection pad, the detection pad used to detect when the predetermined amount of wear has occurred.

10. The brush wear detector system of claim 9, wherein the detection pad is configured to detect when incremental amounts of predetermined wear have occurred.

11. The brush wear detector system of claim 1, further comprising:
    an antenna system at least partially disposed within the dynamoelectric machine;
    wherein the antenna system is configured to communicate with the wireless sensor.

12. The brush wear detector system of claim 1, wherein the dynamoelectric machine is a generator or a motor.

13. A brush wear detector system for a dynamoelectric machine, the brush wear detector system comprising:
    a brush holder;
    at least one brush located within the brush holder;
    at least one spring in contact with the at least one brush and operating to force the brush against an electrically conductive member of the dynamoelectric machine;
    a wireless sensor configured to detect when a predetermined amount of wear has occurred to the at least one brush, the wireless sensor configured to identify the at least one brush having the predetermined amount of wear;

a temperature sensor attached to the wireless sensor, the temperature sensor for detecting a temperature either in or near the at least one brush;

wherein the wireless sensor is attached to the at least one brush.

14. The brush wear detector system of claim 13, wherein the temperature detected by the temperature sensor indicates when the predetermined amount of wear has occurred.

15. The brush wear detector system of claim 13, wherein the wireless sensor is at least one of:

attached to a surface of the at least one brush, and recessed into the at least one brush.

16. The brush wear detector system of claim 13, wherein the wireless sensor is at least one of, an active radio frequency identification device (RFID) and a passive radio frequency identification device (RFID).

17. The brush wear detector system of claim 13, wherein the wireless sensor includes one or more leads, the one or more leads used to detect when the predetermined amount of wear has occurred, and/or when incremental amounts of predetermined wear have occurred.

18. The brush wear detector system of claim 13, wherein the wireless sensor includes a detection pad, the detection pad used to detect when the predetermined amount of wear has occurred, and/or when incremental amounts of predetermined wear have occurred.

19. The brush wear detector system of claim 13, further comprising:

an antenna system at least partially disposed within the dynamoelectric machine;

wherein the antenna system is configured to communicate with the wireless sensor.

20. The brush wear detector system of claim 13, wherein the dynamoelectric machine is a generator or a motor.

* * * * *